US007192307B1

(12) United States Patent
Tran et al.

(10) Patent No.: US 7,192,307 B1

(45) Date of Patent: Mar. 20, 2007

(54) QUICK RELEASE LOCKING LATCH FOR A PANEL MOUNT CONNECTOR

(75) Inventors: Mai-Loan T. Tran, Harrisburg, PA (US); Sau K. Leaw, Singapore (SG)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/379,252

(22) Filed: Apr. 19, 2006

(51) Int. Cl.
*H01R 13/73* (2006.01)
*H02B 1/01* (2006.01)

(52) U.S. Cl. ....................................... 439/553; 439/545

(58) Field of Classification Search ................ 439/247, 439/552, 553, 554, 555, 557, 545, 544, 549, 439/939
See application file for complete search history.

(56) References Cited

U.S. PATENT DOCUMENTS 3,278,145 A * 10/1966 Leshuk ...................... 248/27.3
4,077,693 A * 3/1978 Briel et al. ................. 439/545
6,176,738 B1 * 1/2001 Consoli et al. ............. 439/545
6,773,286 B1 * 8/2004 Wu ............................ 439/247
6,776,637 B2 8/2004 Yamada et al.
6,945,816 B1 * 9/2005 Wu ............................ 439/545
2005/0118882 A1 6/2005 Chiang et al.

* cited by examiner

*Primary Examiner*—Hae Moon Hyeon

(57) ABSTRACT

An electrical connector is adapted for mounting onto a panel having an opening and slots formed along the opening. A mating connector is disposed within the panel. The connector includes a housing having projections configured and disposed to engage the panel opening, corresponding projections and slots properly aligning the connector with the panel opening. Once the connector engages the panel opening, the connector is moved so that the connector projections are misaligned with the panel opening, preventing removal of the connector from the panel opening. A latch slidably engaged along the connector housing is actuated to a latched position so that the latch is positioned within the panel opening, preventing relative movement of the connector with respect to the panel. The latch cannot be removed from the connector by actuating the latch from a latched to an unlatched position.

20 Claims, 4 Drawing Sheets

QUICK RELEASE LOCKING LATCH FOR A PANEL MOUNT CONNECTOR

FIELD OF THE INVENTION

The present invention is directed to a locking latch for a connector, and more specifically to a quick release locking latch for an electrical connector configured for mounting to a panel.

BACKGROUND OF THE INVENTION

Connectors are required to provide electrical power or electrical or electronic control signals between components, such as computers, printers, auxiliary hardware, etc. Typically, the connector includes electrical contacts disposed in a housing that is inserted into a corresponding opening formed in the component. The opening formed in the component includes a mating connector configured for receiving the connector. The operational reliability of the component is directly affected by the integrity of the connection. That is, if the connectors are inadvertently moved out of contact with one another, the components cannot operate as intended.

In response to the need for reliable connections, fasteners, such as screws have been used to secure the connector against the component opening. Although such fasteners provide reliable connections, achieving these connections requires a properly configured tool, i.e., a screwdriver, coordination, operating access to use the tool, as well as the fasteners, which are easily misplaced.

A further advance in providing electrical connections is provided by U.S. Pat. No. 6,776,637 issued to Yamada et al., hereafter “Yamada”. As shown in FIG. 6 of the present application, the present application describes the Yamada construction that provides for a connection with a panel opening 126 formed in a panel 124 by directing a connector 100 having a housing 112, including a block 114 for securing cable 122, into the panel opening 126. Protrusions 120 formed in housing 112 correspond to notches 128 formed in the panel opening 126 when the housing 112 is properly aligned with the panel opening 126. Housing 112 is directed (direction B) inside the panel opening 126 until a flange 116 abuts panel 124 such that protrusions 120 have been inserted past the notches 128. Housing 112 is then directed (direction C) such that protrusions 120 are misaligned with notches 128, thereby capturing connector 100 in panel 124. Finally, a fixing pin 130 is directed (direction A) inside through-hole 118 formed in block 114 such that fixing pin 130 is positioned in panel opening 126 to prevent removal of connector 100 from panel opening 126.

To remove the Yamada connector 100 from the panel 124, a tool (not shown) is inserted inside of a through-hole 134 and a force is applied in a direction opposite direction A. When sufficient force is applied, notches 132 are directed out of contact with protrusions (not shown) disposed in through-hole 118 that previously engaged notches 132 and secured fixing pin 130 in position with respect to through-hole 118. Upon withdrawal of fixing pin 130 from panel opening 126, connector 100 can be removed by reversing the installation directions.

The Yamada connector construction has at least the following disadvantages. First, a tool is required to engage through-hole 134 to remove fixing pin 130 from the installed position inside panel opening 126. Second, if considerable care is not employed, i.e., too much force applied during withdrawal of fixing pin 130, fixing pin 130 can be separated from through-hole 118 and lost. Without fixing pin 130, the Yamada connector is susceptible to inadvertent removal from panel 124.

What is needed is a quick release latched connector that does not require a special tool to achieve removal of the connector, and having a movable latch that cannot be separated from the connector in response to the latch being actuated in a direction that permits removal of the connector.

SUMMARY OF THE INVENTION

The present invention relates to an electrical connector adapted for mounting onto a panel having an opening, a first side, a second side and a slot. The electrical connector includes a housing having a first surface, a second surface, a projection formed on the first surface of the housing, and a feature formed on the second surface of the housing. The projection engages the first side of the panel upon assembly. A latch disposed along the second surface of the housing engages the feature on the second surface of the housing and extends into the panel opening from the second side toward the first side to restrict movement of the housing within the opening.

The present invention further relates to an electrical connector adapted for mounting onto a panel having an opening, a first side, a second side and a slot. The electrical connector includes a housing having a first surface, a second surface, a projection formed on the first surface of the housing, a first feature and a second feature each formed on the second surface of the housing. The projection engages the first side of the panel upon assembly. A latch is disposed along the second surface of the housing having a third feature and a fourth feature. The first feature and the third feature are in locking engagement, and the second feature and the fourth feature are in locking engagement while the latch extends into the panel opening from the second side toward the first side to restrict movement of the housing within the opening.

The present invention yet further relates to a method for assembling an electrical connector onto a panel. The steps of the method include providing a panel, the panel having an opening, a slot, a first side, an opposed second side, and a connector disposed on the first side of the panel and aligned with the opening. The method further includes the step of providing an electrical connector including a housing, the housing having a first surface, a second surface, and a projection formed on the first surface. The projection is configured and disposed for a first movement in a first direction to insert the projection through the corresponding slot in the panel when the connector is inserted in the panel opening so as to position the projection on the first side of the panel. The projection is further configured and disposed for a second movement in a second direction to offset the projection from the corresponding slot such that the projection engages the first side of the panel. The second direction is substantially perpendicular to the first direction, the housing further having a first feature and a second feature each formed on a second surface of the housing. The method further includes the step of providing a latch having a third feature and a fourth feature, the third feature configured and disposed to engage the first feature, the fourth feature configured and disposed to engage the second feature. The method further includes the step of moving the first feature and the third feature into alignment with each other. The method further includes the step of engaging the first feature with the third feature to lock the first and third feature with respect to each other while engaging the latch with the panel opening. The method further includes the step of moving the latch in a third direction with respect to the second surface of the housing so that the second and fourth features are in locked engagement while maintaining the first and third features in locked engagement, so that the latch is fixed with respect to the panel opening while the first and third features and the second and fourth features are in locked engagement.

An advantage of the present invention is that the total number of parts to fabricate a connector is reduced.

A further advantage of the present invention is that a selectably adjustable latch cannot be separated from the connector in response to a force that permits removal of the connector from a panel opening.

A still further advantage of the present invention is that the latch can be actuated without the need for a special tool.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
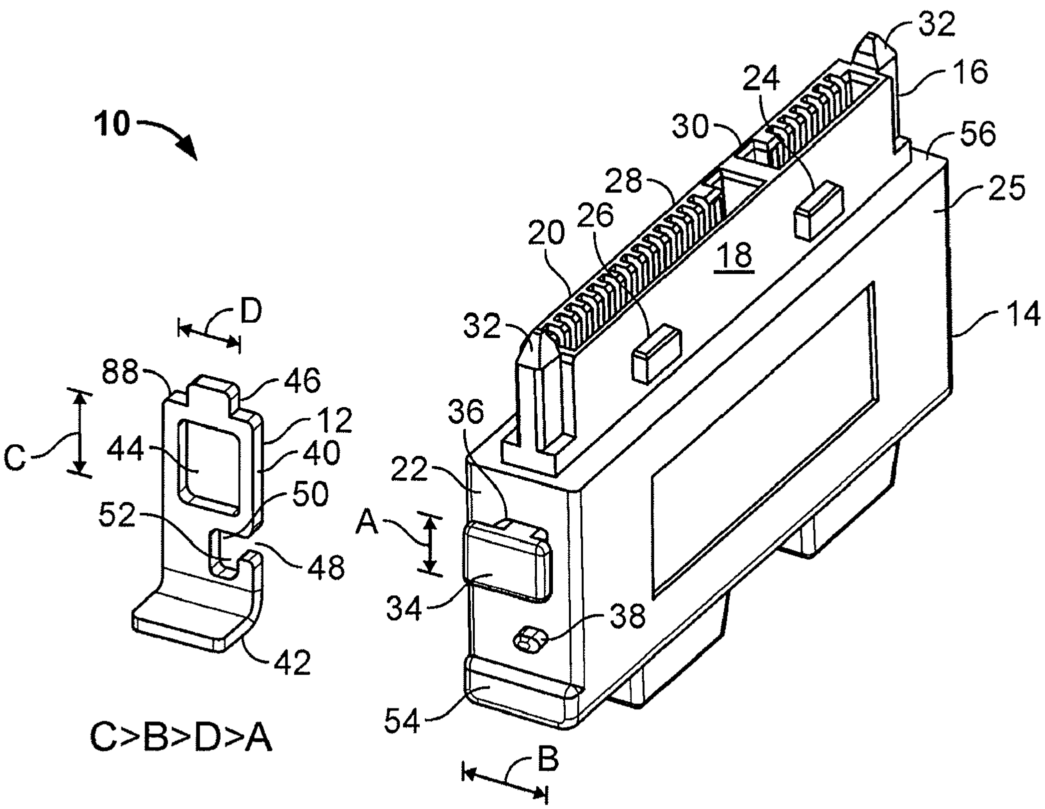
FIG. 1 is an exploded perspective view of a latch connector of the present invention.

The present invention is directed to an electrical connector 10 having a quick release locking latch depicted in FIGS. 1–4. Connector 10 includes a housing 14 having an insertion portion 16 including opposed tapered guides 32, that is inserted inside a mating connector (not shown), preferably mounted in a panel 58 (see FIG. 5). A plurality of contacts are fixedly secured inside housing 14 for providing electrical communication between corresponding contacts of the mating connector upon their connection or engagement. Housing 14 preferably includes a surface 18, a surface 20, a surface 22 and a surface 25, with the paired surfaces 18, 20 and the paired surfaces 22, 25 each being opposite each other. Projections 24, 26 are formed on surface 18, while projections 28, 30 are formed on surface 20, each of projections 24, 26, 28, 30 being formed on insertion portion 16. The arrangement of projections 24, 26, 28, 30 are such that upon directing insertion portion 16 for insertion inside of panel opening 60 of panel 58 (see FIG. 5), there is only one orientation of insertion portion 16 with respect to panel opening 60 that aligns with the panel opening. In other words, in the present example between FIGS. 1 and 5, projections 24, 26 correspond to respective slots 64, 62. Similarly, projections 28, 30 correspond to respective slots 70, 72. Only when insertion portion 16 is so oriented, do the projections 24, 26, 28, 30 align with the corresponding slots 64, 62, 70, 72, permitting insertion of insertion portion 16 inside of the panel opening 60.

Preferably disposed and bridging between opposed surface 18 and surface 20 is surface 22. A feature or knob 34 is formed on surface 22 with a neck 36 preferably disposed between knob 34 and surface 22. Knob 34 preferably has a noncircular profile, such as a rectangle, measuring a length of "B" and a transverse width of "A". Knob 34 is considered to be rectangular, although the corners may be rounded. Disposed adjacent to knob 34 is a feature or protrusion 38 that similarly is formed on surface 22. Disposed adjacent the end of surface 22 opposite insertion portion 16 is a raised region 54 formed on surface 22. Knob 34 and protrusion 38 are configured and disposed to receive a latch 12 that is selectably slidably movable with respect to housing 14. Once latch 12 is assembled to housing 14, raised region 54 acts to maintain latch 12 in an installed position.

Latch 12 includes a first portion 40 and a second portion 42 that are preferably disposed substantially perpendicular to each other. A feature or opening 44 is formed in first portion 40 for receiving knob 34. Preferably, opening 44 is configured to contain a length of "C" which is greater than "B", and a width of "D" that is greater than "A". In other words, opening 44 can be considered to be rectangular, although the corners may be rounded. Additionally, the length of neck 36 is greater than the thickness of first portion 40, so that latch 12 can be assembled to housing 14 with the opening 44 of first portion 40 of latch 12 being disposed surrounding neck 36 with first portion 40 being disposed between surface 22 and knob 34. Further, the end of first portion 40 opposite the junction between first portion 40 and second portion 42 extends from shoulders 88 to a tab 46. Tab 46 becomes the locking feature for connector 10 when the latch is in a retaining or latched position. A further feature of latch 12 includes a slotted passageway 48 formed in one side of first portion 40. Passageway 48 includes a first slotted portion 50 that extends toward the opposite side of first portion 40, first slotted portion 50 further extending to a second slotted portion 52 that proceeds toward the junction of first portion 40 and second portion 42. The combination of the opening 44 and passageway 48 permit assembly of latch 12 to the housing 14.

Figure 2:
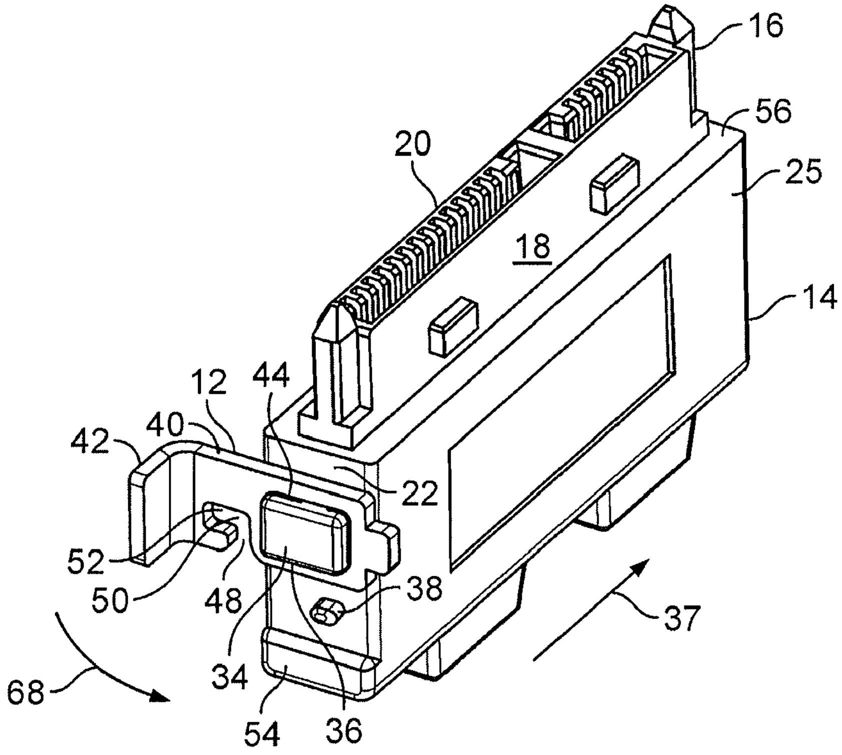
FIG. 2 is a perspective view of a latch directed into fitting engagement with a latch connector of the present invention.
Figure 3:
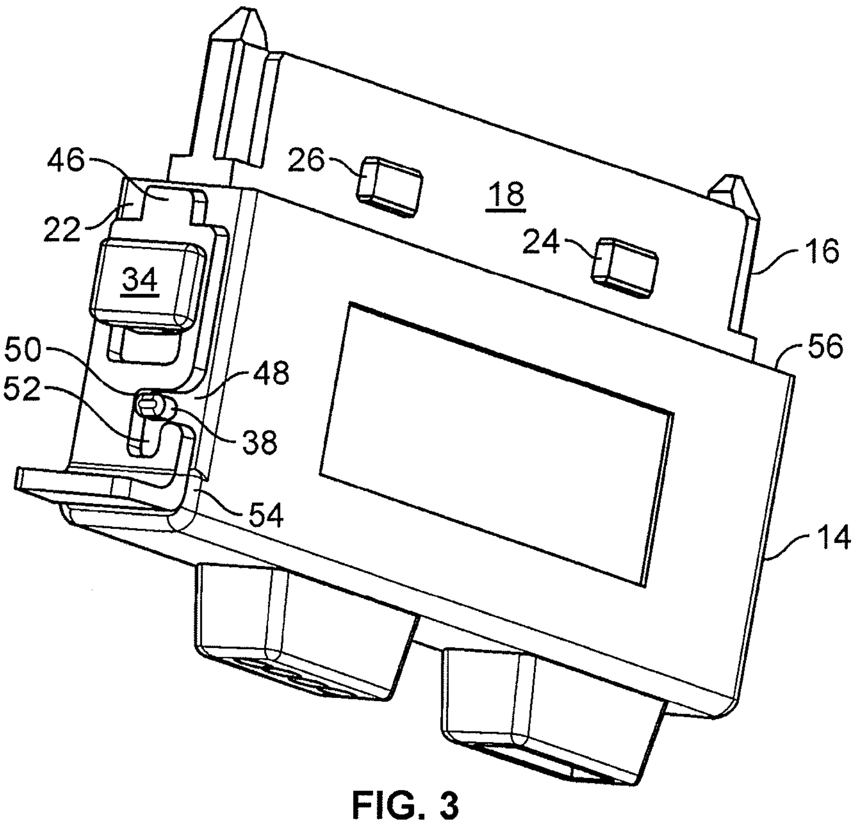
FIG. 3 is a perspective view of a latch connector with the latch disposed in a disengaged position of the present invention.

To show how latch 12 is assembled to housing 14, as shown in FIG. 2, opening 44 of latch 12 is directed over knob 34 so that length "C" of opening 44 is aligned with length "B" of knob 34 and width "D" of opening 44 is aligned with width "A" of knob 34. By virtue of the following relationship as previously described, but identified symbolically in equation [1], $$C>B>D>A \quad [1]$$

once opening 44 and knob 34 are moved into alignment as discussed above and shown in FIG. 2, by directing latch 12 toward housing 14 as indicated by direction 37, knob 34 passes inside and through opening 44 until the surface of first portion 40 abuts surface 22. Stated another way, latch 12 is partially installed onto housing 14. To complete the installation of latch 12 onto housing 14, as shown in FIG. 3, latch 12 is urged into rotational movement 68 (FIG. 2) until protrusion 38 passes inside the entrance to passageway 48 and abuts first portion 40 adjacent the junction between the first slotted portion 50 and the second slotted portion 52. In a preferred embodiment, the latch 12 is rotated 90 degrees, so that first portion 40 is substantially aligned with the housing 14, with second portion 42 extending outwardly from the housing 14. Preferably, once the rotational movement 68 starts, opening 44 and knob 34 are no longer aligned, thus capturing latch 12 by virtue of the locked engagement between opening 44 and knob 34 so that latch 12 is maintained adjacent surface 22.

To achieve the position as shown in FIG. 3, also referred to as the non-retaining or unlatched position, latch 12 is urged into rotational movement 68 as shown in FIG. 2. As latch 12 further undergoes rotational movement 68, a region of first portion 40 adjacent the junction of first portion 40 and second portion 42 is brought into contact with raised region 54. By virtue of the tolerances between the distance between knob 34 and surface 22 and the thickness of first portion 40 and the distance from the surface of raised region 54 and surface 22, there is an amount of resistance to rotational movement 68. That is, due to the contact between raised region 54 and first portion 40, there is a combination of flexure of first portion 40 and/or angular deflection of knob 34 or other elastic deformation, which occurs while first portion 40 is rotatably moved about neck 36. The extent of such elastic deformation and the resulting stresses being dependent upon the fabrication tolerances, materials and associated material properties of the latch 12, neck 36 and knob 34, without exceeding levels that could result in damage to either the housing 14, knob 34, latch 12 or adjacent components.

Figure 4:
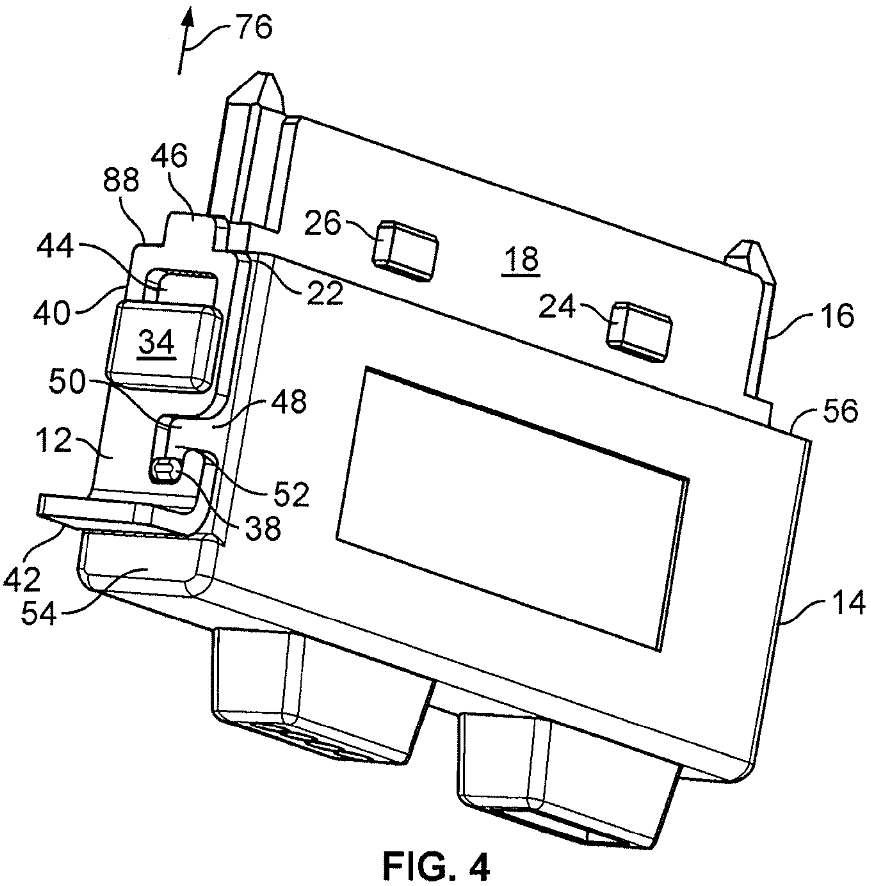
FIG. 4 is a perspective view of a latch connector with the latch disposed in an engaged position of the present invention.

Further, as shown in FIG. 3 in the non-retaining or unlatched position, the end of tab 46 is no more than flush with respect to shoulder 56, and preferably is recessed with respect to shoulder 56. However, in the retaining or latched position as shown in FIG. 4, tab 46 extends past shoulder 56 and away from knob 34. Stated another way, when insertion portion 16 is fully inserted inside panel opening 60 (see FIG. 5) the surface of panel 58 is substantially coincident with shoulder 56, so in the non-retaining or unlatched position, the end of tab 46 is adjacent to, but not abutting against the surface of panel 58. Conversely, after insertion portion 16 is fully inserted inside panel opening 60, connector 10 is directed in a direction 74 (see FIG. 5) that is transverse to the direction bringing connector 10 into initial engagement with panel opening 60, until tab 46 is aligned with an opening 66 that is adjacent panel opening 60. Upon alignment between tab 46 and opening 66, tab 46 is directed into position inside of opening 66. Guided relative movement of tab 46 along surface 22 toward insertion portion 16, or in direction 76 (see FIG. 4), is provided due to the relationships between opening 44 and neck 36 and between the second slotted portion 52 and protrusion 38. In other words, opening 44 and second slotted portion 52 preferably define aligned slots for relative sliding movement of the latch 12 with respect to the housing 14 between respective neck 36 and protrusion 38. Once movement of latch 12 begins, i.e., protrusion 38 is proceeding along the second slotted portion 52, both relationships between opening 44 and neck 36 and between the second slotted portion 52 and protrusion 38 can be considered locked engagements. That is, once movement of latch 12 begins from the unlatched position toward the latched position, the movement of latch 12 is constrained to a vertical movement along housing 14, i.e., the latch 12 cannot be rotated about neck 36. With tab 46 actuated to the retained or latched position, connector 10 cannot be removed from panel 58. To prevent inadvertent release of tab 46 in the retained or latched position, the junction of first portion 40 and second portion 42 is configured to abut the base of raised region 54. However, it is to be understood that the amount of force required to actuate latch 12 between the latched and unlatched positions is to be of low enough magnitude, that tools are not required. That is, an operator (not shown) can apply sufficient force with his or her fingers to second portion 42 to actuate latch 12 toward the desired position, i.e., latched or unlatched.

In operation, to install connector 10 in one panel opening 60 of panel 58, the latch 12 must be actuated to the unlatched position (see FIG. 3). Next, the insertion portion 16 is directed into alignment with panel opening 60 so that projections 26, 24, 28, 30 are aligned with respective slots 62, 64, 70 72. Once alignment is achieved, the insertion portion 16 is moved into full engagement inside panel opening 60 so that shoulder 56 abuts side 84 of panel opening 60 of panel 58 and insertion portion 16 engages the panel connector (not shown), establishing electrical communication between connector 10 and the mating connector. With the insertion portion 16 in its full engagement position, projections 26, 24, 28, 30 have passed inside of slots 62, 64, 70 72 and are disposed on side 86 of panel 58 that is opposite side 84. In other words, projections 26, 24, 28, 30 are disposed on the opposite side of panel 58, i.e., side 86, as compared to shoulder 56 which abuts side 84. Connector 10 is then moved in direction 74 (see FIG. 5) until tab 46 of latch 12 is aligned with opening 66. It is appreciated that the mating connector is a floating connector, in that the mating connector moves with connector 10 in direction 74. Once latch 12 is aligned with opening 66, latch 12 is actuated into the latched position (see FIG. 4) so that tab 46 is in position inside opening 66, thereby preventing inadvertent removal of connector 10 from panel 58. Preferably, shoulders 88 abut side 84 of panel 58 when tab 46 is fully inserted inside opening 66.

To separate or disconnect connector 10 from panel 58, latch 12 is actuated from the latched position to the unlatched position. Next, the connector is moved in a direction opposite to direction 74 until projections 26, 24, 28, 30 are aligned with respective slots 62, 64, 70 72. Once projections 26, 24, 28, 30 are aligned with respective slots 62, 64, 70 72, the connector 10 can be separated from panel 58 by applying a force substantially perpendicular to the plane of panel 58 in a direction away from the panel.

Figure 5:
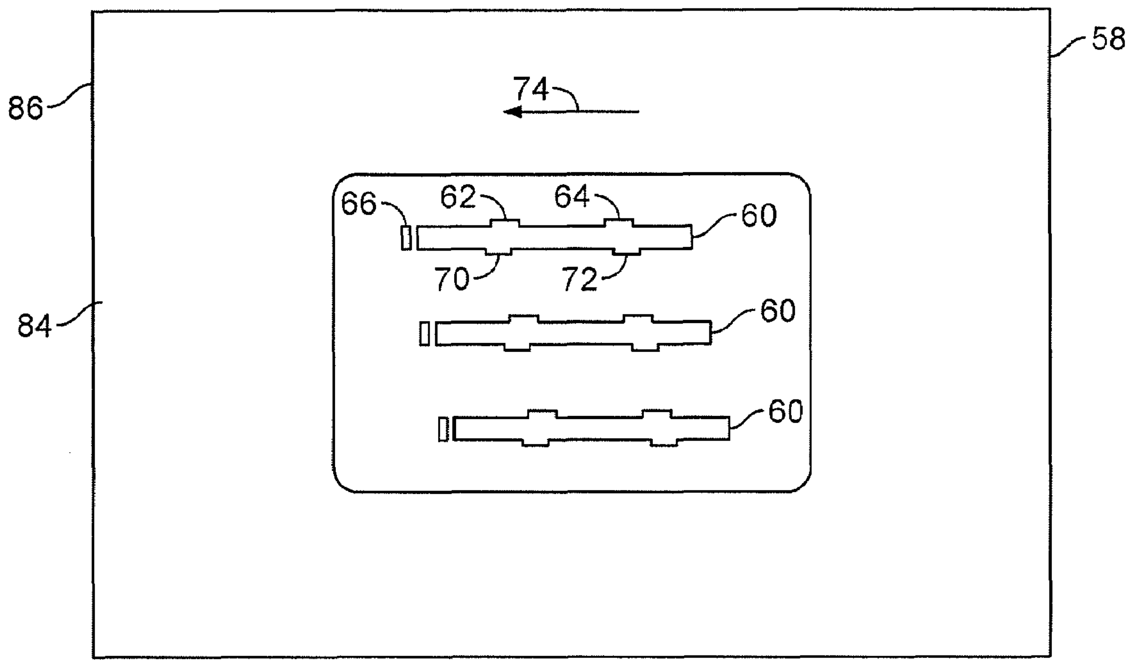
FIG. 5 is an elevation view of panel including openings for receiving latch connectors of the present invention.
Figure 6:
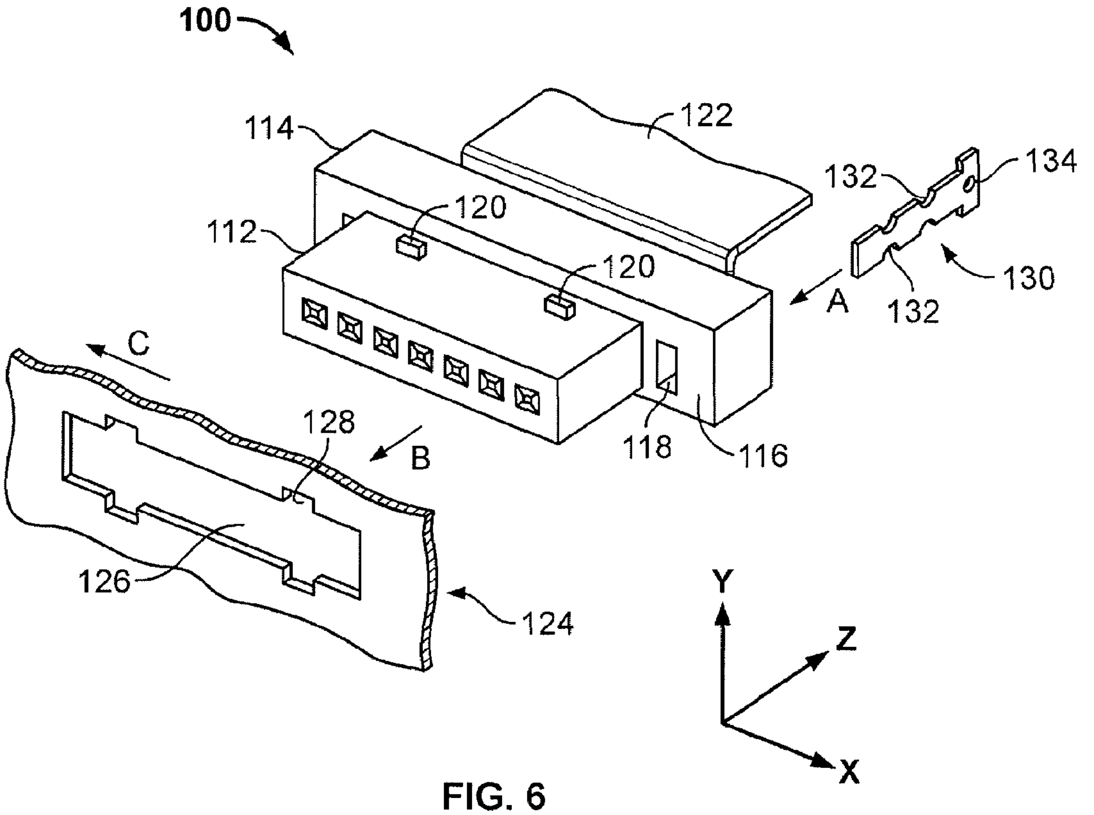
FIG. 6 (Prior Art)
FIG. 6 is an exploded perspective view of a prior art latch connector.
Figure 7:
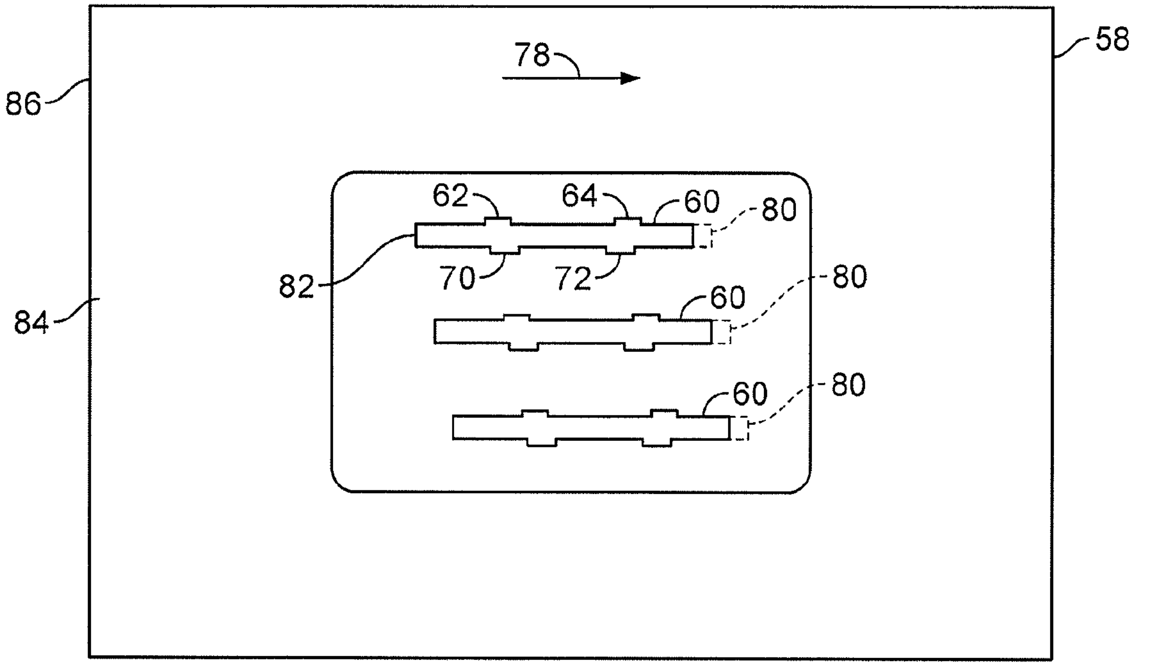
FIG. 7 is an elevation view of a panel having an alternate configuration of openings for receiving latch connectors of the present invention.

It is appreciated by one having skill in the art that instead of requiring a separate opening 66 in addition to panel opening 60, that one side of the panel opening 60 opposite the position of the latch 12 can be elongated. As shown in FIG. 7, panel opening 60 can be configured so that an additional portion 80 is removed as compared to the panel opening 60 construction as shown in FIG. 5. The difference between the panel opening 60 in FIG. 7 is the removal of separate opening 66. As to installation of connector 10, the difference between FIGS. 5 and 7 is that instead of moving connector 10 in direction 74 as shown in FIG. 5, connector 10 is moved in direction 78 (see FIG. 7), i.e., opposite that of direction 74 (see FIG. 5). By virtue then of the additional portion 80 removed, the position of tab 46 of latch 12 is shifted such that tab 46 is installed adjacent to edge 82 of panel opening 60. Alternately, it is also appreciated that latch 12 can be provided to the opposite side of housing 14 than surface 22, or to both sides, if desired. By reversing the position of latch 12, the panel opening 60 is similarly reversed from FIG. 7 in that the portion 80 removed from panel opening 60 would be on the opposite end of the panel opening 60 as shown in FIG. 7, and that the direction for moving connector 10 to achieve the latched position would also be opposite to direction 78 as shown in FIG. 7.

It is to be understood that while a rectangular connector is shown, connector constructions having a different number of sides that are not necessarily opposite to each other can also be used. It is also to be understood that while it is preferable to form projections on opposed surfaces of the connector housing, that only a single projection formed on a single side of the connector housing is required for the connector to function as intended, so long as there is a corresponding slot formed in the panel opening. Further it is also appreciated that the latch can be disposed on any side of the connector, including the same side as the projections. It is also to be understood that housing features, also referred to as knob 34 and protrusion 38 in one embodiment, can be disposed on surface 18, or the same surface as the projections 24, 26. To accommodate latch 12, panel 58 would have a corresponding opening in the panel opening 60. Similarly, it is also contemplated that the features on the housing can be on different surfaces.

Furthermore, it is to be understood that while in a preferred embodiment, as shown, latch 12 contains opening 44 and passageway 48 and housing 14 contains corresponding respective knob 34 and projection 38, alternate constructions are contemplated. For example, the latch could contain a knob and projection and the housing could contain an opening and passageway or any combination thereof. Moreover, the latch and housing could be configured so that a rotational movement may not be required to engage the latch to the housing, although any combination of translation and rotational movements to capture and separate the latch and housing is contemplated. Further, the opening/protrusion/slot can include any number of shapes that can be configured that still permit engagement between the latch and housing. However, irrespective the arrangement, the locking engagement or engagements between the latch and the housing should be constructed so as to captivate the latch for movement adjacent to the housing so that when the latch is actuated from a latched and an unlatched position, there is no possibility of the latch inadvertently becoming separated from the housing.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electrical connector adapted for mounting onto a panel having an opening, a first side, a second side and a slot for receiving the electrical connector, the electrical connector comprising:

a housing having a first surface, an outer second surface, a projection formed on the first surface of the housing, a shoulder, and a feature formed on the second surface of the housing;

the projection engaging the first side of the panel upon assembly after the projection has been inserted through the opening from the second side of the panel while the projection and the slot are aligned, the shoulder abutting the second side of the panel, the projection and the slot then being misaligned; and a latch disposed along the second surface of the housing engaging the feature on the second surface of the housing and extending into the panel opening from the second side toward the first side to restrict movement of the housing within the opening.

2. The electrical connector of claim 1 wherein the panel opening includes a second opening for receiving the latch.

3. The electrical connector of claim 1 wherein the housing includes a raised region formed on the second surface to retain the latch in the panel opening.

4. The electrical connector of claim 1 wherein the housing has a projection formed on a third surface for engaging the first side of the panel upon assembly.

5. The electrical connector of claim 4 wherein the first and third surfaces are opposed surfaces with the second surface bridging the first and third surfaces.

6. The electrical connector of claim 1 wherein the feature is a knob extending from and spaced from the second surface, the latch having an opening for receiving the knob, the latch captured between the knob and the second surface for sliding movement along the second surface.

7. The electrical connector of claim 6 wherein the opening of the latch rotatably engages the knob.

8. The electrical connector of claim 7 wherein the latch opening is noncircular.

9. The electrical connector of claim 1 wherein the first surface and the second surface are the same surface.

10. The electrical connector of claim 6 wherein the knob is noncircular.

11. The electrical connector of claim 7 wherein the latch has a slotted passageway for rotatably receiving a protrusion formed on the second surface of the housing, the protrusion preventing rotational movement of the latch upon the latch being positioned in the panel opening.

12. An electrical connector adapted for mounting onto a panel having an opening, a first side, a second side and a slot for receiving the electrical connector, the electrical connector comprising:

a housing having a first surface, a second surface, a projection formed on the first surface of the housing, a first feature and a second feature each formed on the second surface of the housing;

the projection engaging the first side of the panel upon assembly after the projection has been inserted through the opening from the second side of the panel while the projection and the slot are aligned, the projection and the slot then being misaligned; and a latch having a shoulder, the latch disposed along the second surface of the housing having a third feature and a fourth feature, the first feature and the third feature in locking engagement to each other, and the second feature and the fourth feature in locking engagement to each other, respectively, while the latch extends into the panel opening from the second side toward the first side to restrict movement of the housing within the opening, the shoulder abutting the second side of the panel.

13. The electrical connector of claim 12 wherein the first feature is a knob extending from and spaced from the second surface, the second feature is a protrusion, the third feature is an opening, and the fourth feature is a passageway.

14. The electrical connector of claim 13 wherein the opening of the latch rotatably engages the knob and the passageway rotatably engages the protrusion, upon completion of the rotatable engagement, the latch is in an unlatched position.

15. The electrical connector of claim 14 wherein the latch is slidably movable from the unlatched position toward a latched position, the protrusion preventing rotational movement of the latch upon the latch being moved toward the latched position and abutting the passageway.

16. The electrical connector of claim 15 wherein the latch cannot be disengaged from the housing during movement of the latch from the latched position to the unlatched position.

17. The electrical connector of claim 15 wherein the housing includes a raised region formed on the second surface to retain the latch in the latched position.

18. The electrical connector of claim 12 wherein the panel opening includes a second opening for receiving the latch.

19. A method for assembling an electrical connector onto a panel, the steps of the method comprising:

providing the panel, the panel having an opening, a slot integrally formed with the opening, a first side, an opposed second side, and the connector disposed on the first side of the panel and aligned with the opening;

providing an electrical connector including a housing, the housing having a first surface, an outer second surface, a shoulder, and a projection formed on the first surface, the projection being configured and disposed for a first movement in a first direction to insert the projection through the corresponding slot in the panel when the connector is inserted in the panel opening so as to position the projection on the first side of the panel, the shoulder abutting the second side of the panel, the projection being further configured and disposed for a second movement in a second direction to offset the projection from the corresponding slot such that the projection engages the first side of the panel, wherein the second direction is substantially perpendicular to the first direction, the housing further having a first feature and a second feature each formed on the second surface of the housing;

providing a latch having a third feature and a fourth feature, the third feature configured and disposed to engage the first feature, the fourth feature configured and disposed to engage the second feature;

moving the first feature and the third feature into alignment with each other; and engaging the first feature with the third feature to lock the first and third feature with respect to each other while engaging the latch with the panel opening;

moving the latch in a third direction with respect to the second surface of the housing so that the second and fourth features are in locked engagement while maintaining the first and third features in locked engagement, so that the latch is fixed with respect to the panel opening while the first and third features and the second and fourth features are in locked engagement.

20. The method of claim 19 wherein the panel opening includes a second opening for receiving the latch.

* * * * *